US011537566B1

(12) United States Patent
Harjono et al.

(10) Patent No.: US 11,537,566 B1
(45) Date of Patent: Dec. 27, 2022

(54) ZONE BALANCING IN A MULTI CLUSTER DATABASE SYSTEM

(71) Applicant: Snowflake Inc., Bozeman, MT (US)

(72) Inventors: Johan Harjono, San Francisco, CA (US); Daniel Geoffrey Karp, San Carlos, CA (US); Rares Radut, Kitchener (CA); Samir Rehmtulla, San Mateo, CA (US); Arthur Kelvin Shi, San Francisco, CA (US); Thanakul Wattanawong, Berkeley, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/806,852

(22) Filed: Jun. 14, 2022

Related U.S. Application Data

(63) Continuation of application No. 17/461,169, filed on Aug. 30, 2021, now Pat. No. 11,372,820.

(60) Provisional application No. 63/260,425, filed on Aug. 19, 2021.

(51) Int. Cl.
G06F 16/00 (2019.01)
G06F 16/182 (2019.01)
G06F 16/28 (2019.01)

(52) U.S. Cl.
CPC ........ *G06F 16/1824* (2019.01); *G06F 16/285* (2019.01)

(58) Field of Classification Search
CPC ............................ G06F 16/1824; G06F 16/285
USPC ........................................................ 707/827
See application file for complete search history.

(56) References Cited

U.S. PATENT DOCUMENTS

| 10,909,135 | B1 | 2/2021 | Stotts et al. | |
|---|---|---|---|---|
| 11,436,218 | B2* | 9/2022 | Cai | G06F 1/14 707/707 |
| 2012/0233251 | A1* | 9/2012 | Holt | G06F 11/2097 709/204 |
| 2012/0233463 | A1* | 9/2012 | Holt | H04L 67/1097 713/168 |
| 2020/0236159 | A1 | 7/2020 | Shang | |
| 2021/0034605 | A1* | 2/2021 | Cai | G06F 16/2379 707/707 |

(Continued)

OTHER PUBLICATIONS

"U.S. Appl. No. 17/461,169, Non Final Office Action dated Jan. 5, 2022", 8 pgs.

(Continued)

*Primary Examiner* — Alexandria Y Bromell
(74) *Attorney, Agent, or Firm* — Schwegman Lundberg & Woessner, P.A.

(57) ABSTRACT

The subject technology determines an availability zone skew among multiple zones. The subject technology, based on the availability zone skew, determines a target skew to meet a global balancing of cluster instances. The subject technology, based on the target skew, selects a particular zone among multiple zones. The subject technology deploys a particular type of cluster instance to the particular zone. The subject technology, for each zone from the multiple zones, determining a respective number of cluster instances. The subject technology identifies a first zone that includes a highest number of cluster instances based on the respective number of cluster instances from each zone. The subject technology identifies a second zone that includes a lowest number of cluster instances based on the respective number of cluster instances from each zone.

18 Claims, 11 Drawing Sheets

(56) References Cited

U.S. PATENT DOCUMENTS

2021/0120079 A1    4/2021  Pahwa et al.
2021/0272137 A1    9/2021  Hankinson et al.

OTHER PUBLICATIONS

"U.S. Appl. No. 17/461,169, Notice of Allowance dated Apr. 6, 2022", 9 pgs.
"U.S. Appl. No. 17/461,169, Response filed Feb. 24, 2022 to Non Final Office Action dated Jan. 5, 2022", 11 pgs.

* cited by examiner

800

DETERMINE, AFTER A PERIOD OF TIME ELAPSES OVER A PERIODIC SEGMENT OF TIME, AN IMBALANCE OF CLUSTER INSTANCES DEPLOYED IN MULTIPLE ZONES BASED ON A THRESHOLD VALUE
802

IDENTIFY A PARTICULAR TYPE OF CLUSTER INSTANCE TO INCLUDE IN A PARTICULAR ZONE FROM THE MULTIPLE ZONES
804

ADD THE PARTICULAR TYPE OF CLUSTER INSTANCE TO THE PARTICULAR ZONE TO MEET A GLOBAL BALANCING OF CLUSTER INSTANCES IN THE MULTIPLE ZONES
806

DETERMINE, AFTER A SECOND PERIOD OF TIME ELAPSES OVER THE PERIODIC SEGMENT OF TIME, THAT A NUMBER OF CLUSTER INSTANCES DEPLOYED IN THE MULTIPLE ZONES IS A BELOW THE THRESHOLD VALUE INDICATING A CURRENT BALANCE OF CLUSTER INSTANCES IN THE MULTIPLE ZONES
808

DETERMINE A SECOND PARTICULAR ZONE FROM ONE OF THE MULTIPLE ZONES THAT INCLUDES A PARTICULAR NUMBER OF CLUSTER INSTANCES THAT IS GREATER THAN EACH NUMBER OF INSTANCES FROM EACH OF THE MULTIPLE ZONES
1002

IDENTIFY A SECOND PARTICULAR TYPE OF CLUSTER INSTANCE TO REMOVE BASED ON THE SECOND PARTICULAR ZONE
1004

REMOVE THE SECOND PARTICULAR TYPE OF CLUSTER INSTANCE FROM THE SECOND PARTICULAR ZONE TO MEET THE GLOBAL BALANCING OF CLUSTER INSTANCES IN THE MULTIPLE ZONES
1006

*FIG. 10*

ZONE BALANCING IN A MULTI CLUSTER DATABASE SYSTEM

CROSS-REFERENCE TO RELATED APPLICATIONS

This application is a continuation of U.S. patent application Ser. No. 17/461,169, filed Aug. 30, 2021, and claims priority to U.S. Provisional Patent Application Ser. No. 63/260,425, filed Aug. 19, 2021, and the contents of each of which are incorporated herein by reference in their entireties for all purposes.

TECHNICAL FIELD

Embodiments of the disclosure relate generally to databases and, more specifically, to resource management related to performing tasks in conjunction with such databases.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Databases are widely used for data storage and access in computing applications. A goal of database storage is to provide enormous sums of information in an organized manner so that it can be accessed, managed, and updated.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

When certain information is to be extracted from a database, a query statement may be executed against the database data. A network-based database system processes the query and returns certain data according to one or more query predicates that indicate what information should be returned by the query. The database system extracts specific data from the database and formats that data into a readable form.

Queries can be executed against database data to find certain data within the database. A database query extracts data from the database and formats it into a readable form. For example, when a user wants data from a database, the user may write a query in a query language supported by the database. The query may request specific information from the database. The query may request any pertinent information that is stored within the database. If the appropriate data can be found to respond to the query, the database has the potential to reveal complex trends and activities.

BRIEF DESCRIPTION OF THE DRAWINGS

The present disclosure will be understood more fully from the detailed description given below and from the accompanying drawings of various embodiments of the disclosure.

FIG. 8 is a flow diagram illustrating operations of a database system in performing a method, in accordance with some embodiments of the present disclosure.

FIG. 10 is a flow diagram illustrating operations of a database system in performing a method, in accordance with some embodiments of the present disclosure.

DETAILED DESCRIPTION

Figure 1:
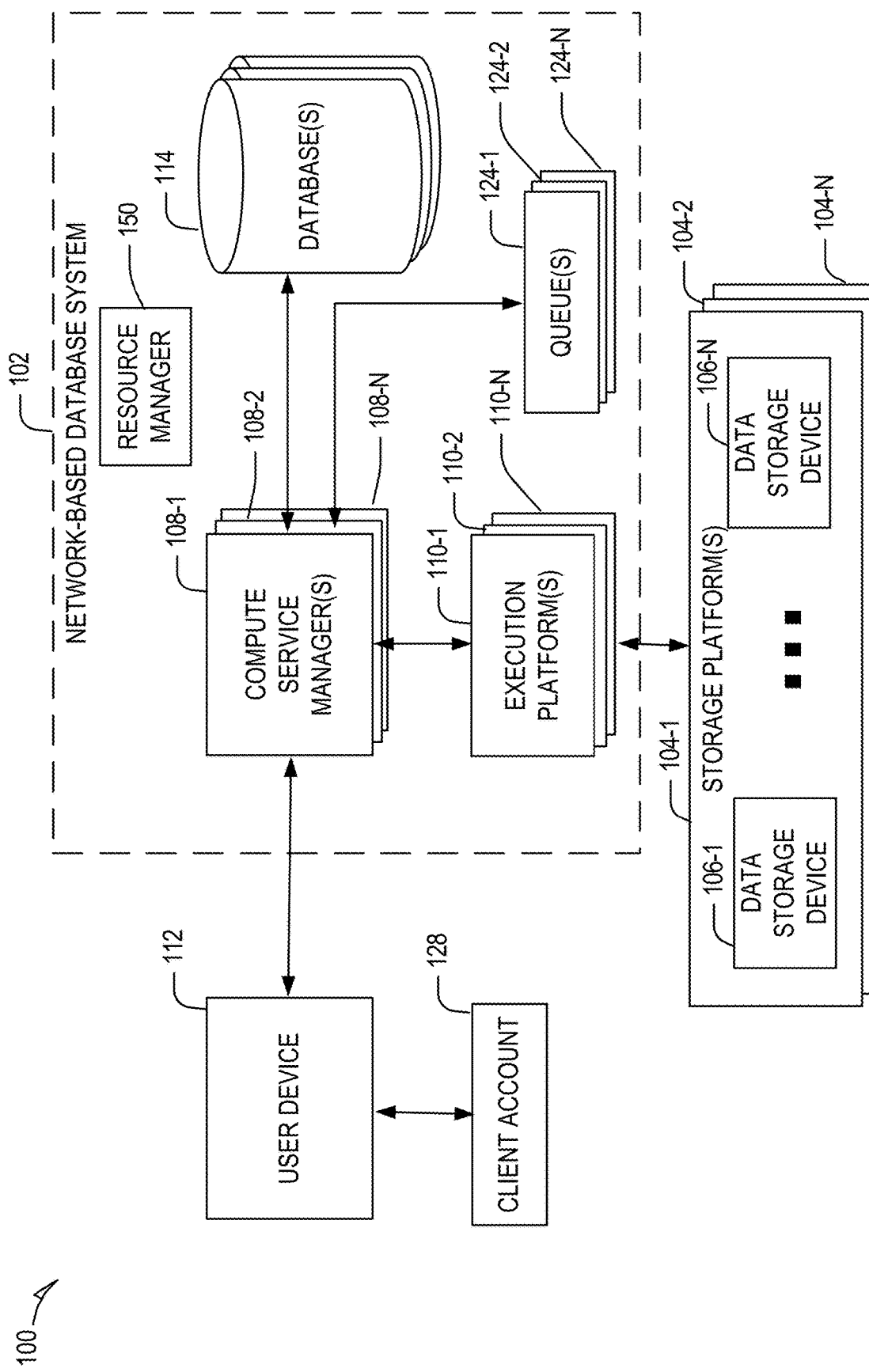
FIG. 1 illustrates an example computing environment that includes a network-based database system in communication with a storage platform, in accordance with some embodiments of the present disclosure.

Reference will now be made in detail to specific example embodiments for carrying out the inventive subject matter.

Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

In some instances, users (e.g., customers) want a database system to be available at all times and this means that a cloud services layer, which coordinates various services and schedules virtual warehouses to run queries, to be resilient against a number of failure modes. In an example, one such rare but catastrophic case is when a cloud service provider's datacenter suffers an unexpected outage.

As described further herein, a given cloud service provider (e.g., AWS®, Google Cloud Platform®, Microsoft Azure °, and the like) can provide availability zones, which are isolated datacenters in a single region that the subject system can choose to provision resources from. By keeping cloud services instances balanced across such availability zones, the subject system can reduce the impact on users (e.g., customers) in the event of availability zone failures, as requests can transparently be redirected to an instance in another zone.

In light of the foregoing, embodiments of the subject technology provide load balancing across multiple clusters that each include respective virtual warehouses that execute queries (and perform other operations).

The systems, methods, and devices described herein provide embodiments for scheduling and executing tasks on shared storage and execution platforms. The systems, methods, and devices described herein may be implemented on network-based database platforms. Further, the implementations described herein enable queries to be executed on behalf of a client account.

FIG. 1 illustrates an example computing environment 100 that includes a network-based database system 102 in communication with a storage platform 104-1, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

In some embodiments, the network-based database system 102 includes compute service manager 108-1 to compute service manager 108-N, each of which can be in communication with one or more of queue 124-1 to queue 124-N, a client account 128, database(s) 114, and execution platform 110-1 to execution platform 110-N. In embodiments, each execution platform can correspond to a given (or different) cloud service provider (e.g., AWS®, Google Cloud Platform®, Microsoft Azure °, and the like).

In an embodiment, a compute service manager (e.g., any of the compute service managers shown in FIG. 1) does not receive any direct communications from a client account 128 and only receives communications concerning jobs from the queue. In particular implementations, a compute service manager can support any number of client accounts 128 such as end users corresponding to respective one or more of user device 112 that provide data storage and retrieval requests, system administrators managing the systems and methods described herein, and other components/devices that interact with the compute service manager. As used herein, a compute service manager may also be referred to as a "global services system" that performs various functions as discussed herein, and each of compute service manager 108-1 to compute service manager 108-N can correspond to a particular cluster (or clusters) of computing resources as described further herein.

Thus it is appreciated that embodiments of the subject technology can provide multiple instances of the aforementioned components, where each instance of a compute service manager can also utilize different instances of an execution platform, database, or queue. In particular, it is appreciated that the network-based database system 102 provides different instances of components to enable different versions of databases or execution platforms to be utilized by a given compute service manager, ensuring further flexibility to perform operations in connection with executing queries (e.g., received from client account 128 associated with user device 112). For example, a particular query can be compatible with a particular version of a database or execution platform, and it can be imperative that a given compute service manager facilitate execution of such a query to that particular of the database or execution platform as provided by the network-based database system 102.

As shown, the computing environment 100 comprises the network-based database system 102 and a storage platform 104 (e.g., AWS®, Microsoft Azure Blob Storage®, or Google Cloud Storage®). The network-based database system 102 is used for accessing and/or processing integrated data from one or more disparate sources including data storage devices 106-1 to 106-N within the storage platform 104. The storage platform 104 comprises a plurality of computing machines and provides on-demand computer system resources such as data storage and computing power to the network-based database system 102.

The network-based database system 102 includes one or more compute service managers, execution platforms, and databases. The network-based database system 102 hosts and provides database services to multiple client accounts. Administrative users can create and manage identities (e.g., users, roles, and groups) and use permissions to allow or deny access to the identities to resources and services.

Each compute service manager (e.g., any of the compute service managers shown in FIG. 1) coordinates and manages operations of the network-based database system 102. The compute service manager also performs query optimization and compilation as well as managing clusters of computing services that provide compute resources (also referred to as "virtual warehouses"). The compute service manager can support any number of client accounts such as end users providing data storage and retrieval requests, system administrators managing the systems and methods described herein, and other components/devices that interact with compute service manager 108-1.

The compute service manager (e.g., any of the compute service managers shown in FIG. 1) is also in communication with a user device 112. The user device 112 corresponds to a user of one of the multiple client accounts supported by the network-based data-warehouse system 102. As shown, the user is associated with a client account 128. In some embodiments, the compute service manager 108-1 does not receive any direct communications from the user device 112 and only receives communications concerning jobs from a queue 124-1 within the network-based database system 102.

The compute service manager is also coupled to one or more database 114, which is associated with the data stored the computing environment 100. The database 114 stores data pertaining to various functions and aspects associated with the network-based database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

In some embodiments, the compute service manager may determine that a job should be performed based on data from the database 114. In such embodiments, the compute service manager may scan the data and determine that a job should be performed to improve data organization or database performance. For example, the compute service manager may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager may determine that a job should be performed. In some embodiments, the compute service manager determines that a job should be performed based on a trigger event and stores the job in a queue until the compute service manager is ready to schedule and manage the execution of the job. In an embodiment of the disclosure, the compute service manager determines whether a table or pruning index needs to be reclustered based on one or more DML commands being performed, wherein one or more of DML commands constitute the trigger event.

The compute service manager may receive rules or parameters from the client account 128 and such rules or parameters may guide the compute service manager in scheduling and managing internal jobs. The client account 128 may indicate that internal jobs should only be executed at certain times or should only utilize a set maximum amount of processing resources. The client account 128 may further indicate one or more trigger events that should prompt the compute service manager to determine that a job should be performed. The client account 128 may provide parameters concerning how many times a task may be re-executed and/or when the task should be re-executed.

The compute service manager is in communication with one or more queue 124-1. In an embodiment, the compute service manager does not receive any direct communications from a client account 128 and only receives communications concerning jobs from the queue 124-1. In particular implementations, the compute service manager can support any number of client accounts 128 such as end users providing data storage and retrieval requests, system administrators managing the systems and methods described herein, and other components/devices that interact with compute service manager.

The queue 124-1 may provide a job to the compute service manager. One or more jobs may be stored in the queue 124-1 in an order of receipt and/or an order of priority, and each of those one or more jobs may be communicated to the compute service manager to be scheduled and executed.

In an implementation, the queue 124-1 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth.

The queue 124-1 may determine internal jobs that should be performed to improve the performance of the database and/or to improve the organization of database data. In an embodiment, the queue 124-1 does not store queries to be executed for a client account but instead only stores database jobs that improve database performance.

A compute service manager is further coupled to an execution platform (e.g., one of execution platform 110-1, execution platform 110-2, execution platform 110-N), which provides multiple computing resources that execute various data storage and data retrieval tasks. The execution platform is coupled to one of a storage platform (e.g., storage platform 104-1, storage platform 104-2, storage platform 104-N). The storage platform 104-1 comprises multiple data storage devices 106-1 to 106-N, and each other storage platform can also include multiple data storage devices. In some embodiments, the data storage devices 106-1 to 106 -N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the storage platform 104 may include distributed file systems (such as Hadoop Distributed File Systems (HDFS)), object storage systems, and the like. Similarly, any of the data storage devices in other storage platforms can also have similar characteristics described above in connection with storage platform 104-1.

The execution platform (e.g., any of the execution platforms shown in FIG. 1) comprises a plurality of compute nodes. A set of processes on a compute node executes a query plan compiled by the compute service manager. The set of processes can include: a first process to execute the query plan; a second process to monitor and delete micropartition files using a least recently used (LRU) policy and implement an out of memory (OOM) error mitigation process; a third process that extracts health information from process logs and status to send back to the compute service manager 108-1; a fourth process to establish communication with the compute service manager 108-1 after a system boot; and a fifth process to handle all communication with a compute cluster for a given job provided by the compute service manager 108-1 and to communicate information back to the compute service manager 108-1 and other compute nodes of the execution platform.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110-1. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Each of compute service manager, database, execution platform, and storage platform shown in FIG. 1 may be implemented as a distributed system (e.g., distributed across multiple systems/platforms at multiple geographic locations). Additionally, each of the compute service manager, database, execution platform, and storage platform can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by a compute service manager. These jobs are scheduled and managed by the compute service manager to determine when and how to execute the job. For example, the compute service manager may divide the job into multiple discrete tasks and may determine what data is needed to execute each of the multiple discrete tasks. The compute service manager may assign each of the multiple discrete tasks to one or more nodes of an execution platform to process the task. The compute service manager 108-1 may determine what data is needed to process a task and further determine which nodes within the execution platform 110-1 are best suited to process the task. Some nodes may have already cached the data needed to process the task and, therefore, be a good candidate for processing the task. Metadata stored in the database 114 assists the compute service manager in determining which nodes in the execution platform have already cached at least a portion of the data needed to process the task. One or more nodes in the execution platform process the task using data cached by the nodes and, if necessary, data retrieved from the storage platform. It is desirable to retrieve as much data as possible from caches within the execution platform because the retrieval speed is typically much faster than retrieving data from the storage platform.

As shown in FIG. 1, the computing environment 100 separates the execution platforms from the storage platforms. In this arrangement, the processing resources and cache resources in the execution platforms operate independently of the data storage devices in the storage platforms. Thus, the computing resources and cache resources are not restricted to specific data storage devices. Instead, all computing resources and all cache resources may retrieve data from, and store data to, any of the data storage resources in the storage platform.

As described further herein, a resource manager 150 can perform load balancing operation in connection with availability zones ("AZ" as mentioned further herein) including different clusters of instances of compute service managers with varying computing resources (e.g., different virtual warehouses, and the like).

Figure 2:
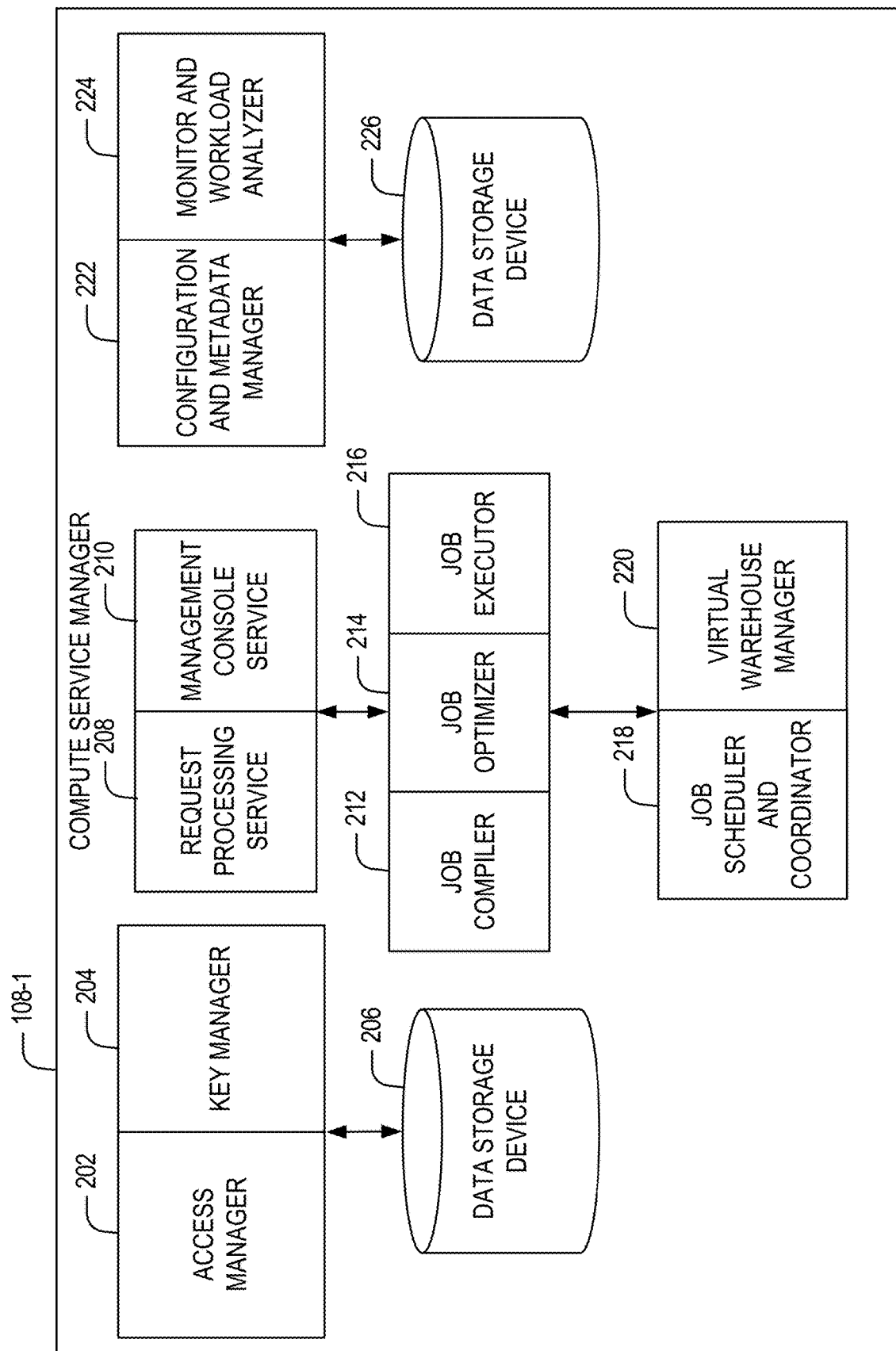
FIG. 2 is a block diagram illustrating components of a compute service manager, in accordance with some embodiments of the present disclosure.

FIG. 2 is a block diagram illustrating components of the compute service manager 108-1, in accordance with some embodiments of the present disclosure. As shown in FIG. 2, the compute service manager 108-1 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104-1). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110-1 or in a data storage device in storage platform 104-1.

A management console service 210 supports access to various systems and processes by administrators and other system managers. Additionally, the management console service 210 may receive a request to execute a job and monitor the workload on the system.

The compute service manager 108-1 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108-1.

A job scheduler and coordinator 218 sends received jobs to the appropriate services or systems for compilation, optimization, and dispatch to the execution platform 110-1. For example, jobs may be prioritized and processed in that prioritized order. In an embodiment, the job scheduler and coordinator 218 determines a priority for internal jobs that are scheduled by the compute service manager 108-1 with other "outside" jobs such as user queries that may be scheduled by other systems in the database but may utilize the same processing resources in the execution platform 110-1. In some embodiments, the job scheduler and coordinator 218 identifies or assigns particular nodes in the execution platform 110-1 to process particular tasks. A virtual warehouse manager 220 manages the operation of multiple virtual warehouses implemented in the execution platform 110-1. As discussed below, each virtual warehouse includes multiple execution nodes that each include a cache and a processor.

Additionally, the compute service manager 108-1 includes a configuration and metadata manager 222, which manages the information related to the data stored in the remote data storage devices and in the local caches (e.g., the caches in execution platform 110-1). The configuration and metadata manager 222 uses the metadata to determine which data micro-partitions need to be accessed to retrieve data for processing a particular task or job. A monitor and workload analyzer 224 oversee processes performed by the compute service manager 108-1 and manages the distribution of tasks (e.g., workload) across the virtual warehouses and execution nodes in the execution platform 110-1. The monitor and workload analyzer 224 also redistribute tasks, as needed, based on changing workloads throughout the network-based database system 102 and may further redistribute tasks based on a user (e.g., "external") query workload that may also be processed by the execution platform 110-1. The configuration and metadata manager 222 and the monitor and workload analyzer 224 are coupled to a data storage device 226. Data storage device 226 in FIG. 2 represent any data storage device within the network-based database system 102. For example, data storage device 226 may represent caches in execution platform 110-1, storage devices in storage platform 104-1, or any other storage device.

Although the above discussion and examples are related to compute service manager 108-1, in some embodiments, similar or the same components are included in each of the compute service managers shown in FIG. 1.

Figure 3:
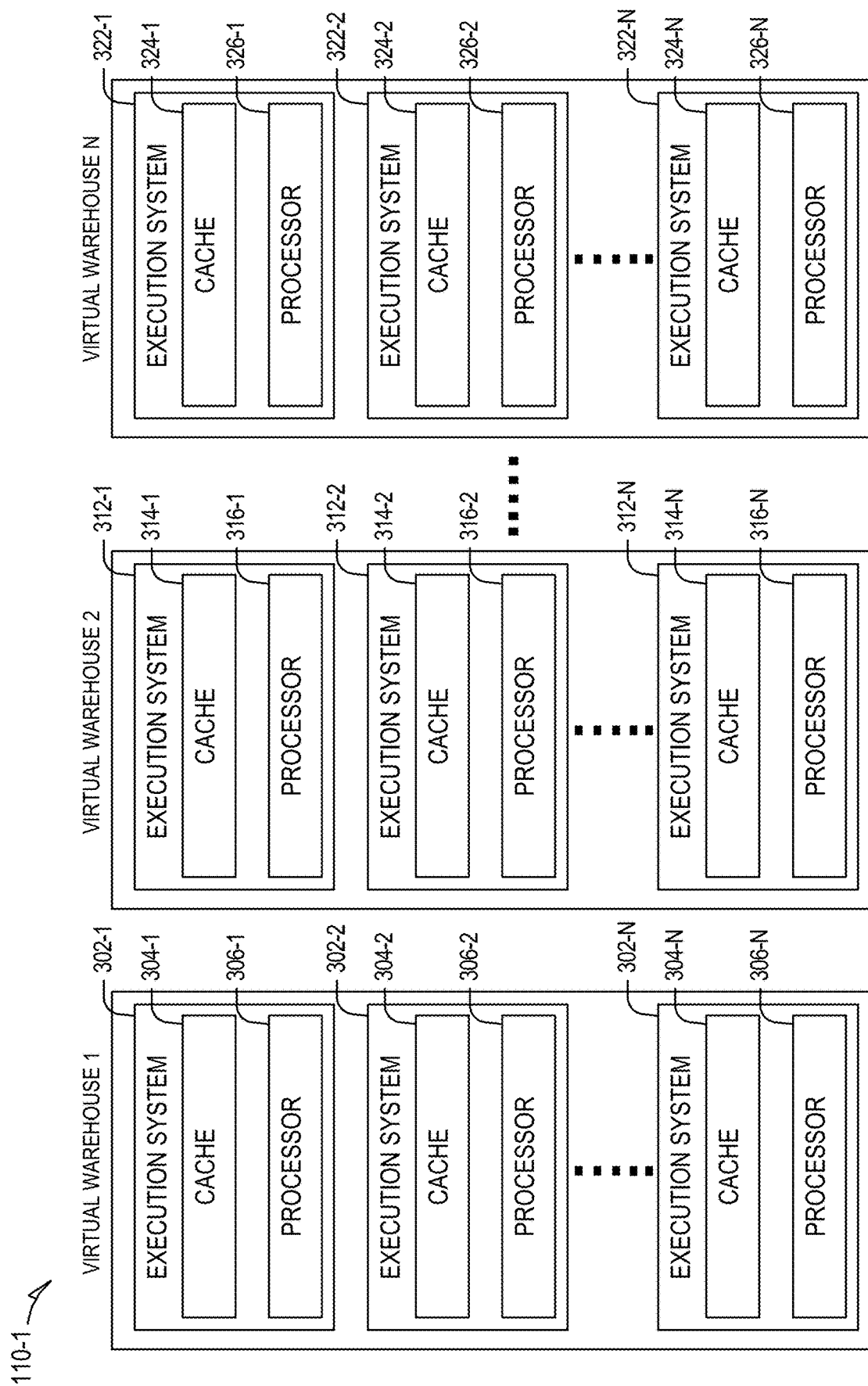
FIG. 3 is a block diagram illustrating components of an execution platform, in accordance with some embodiments of the present disclosure.

FIG. 3 is a block diagram illustrating components of the execution platform 110-1, in accordance with some embodiments of the present disclosure. As shown in FIG. 3, the execution platform 110-1 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110-1 can add new virtual warehouses and drop existing virtual warehouses in real-time based on the current processing needs of the systems and users. This flexibility allows the execution platform 110-1 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110-1, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110-1 is also fault tolerant. For example, if one virtual warehouse fails, that virtual warehouse is quickly replaced with a different virtual warehouse at a different geographic location.

A particular execution platform 110-1 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although the above discussion and examples are related to execution platform 110-1, in some embodiments, similar or the same components are included in each of the execution platforms shown in FIG. 1.

In some examples, cloud service providers corresponding to a given execution platform provide multiple availability zones in a region. These zones can go down due to unforeseen events. Embodiments of the subject technology can actively and passively balance the placement of instances of compute service managers (e.g., compute service manager 108-1, compute service manager 108-2, compute service manager 108-N) among availability zones in a way that offers maximum protection against availability zone outages.

Figure 4:
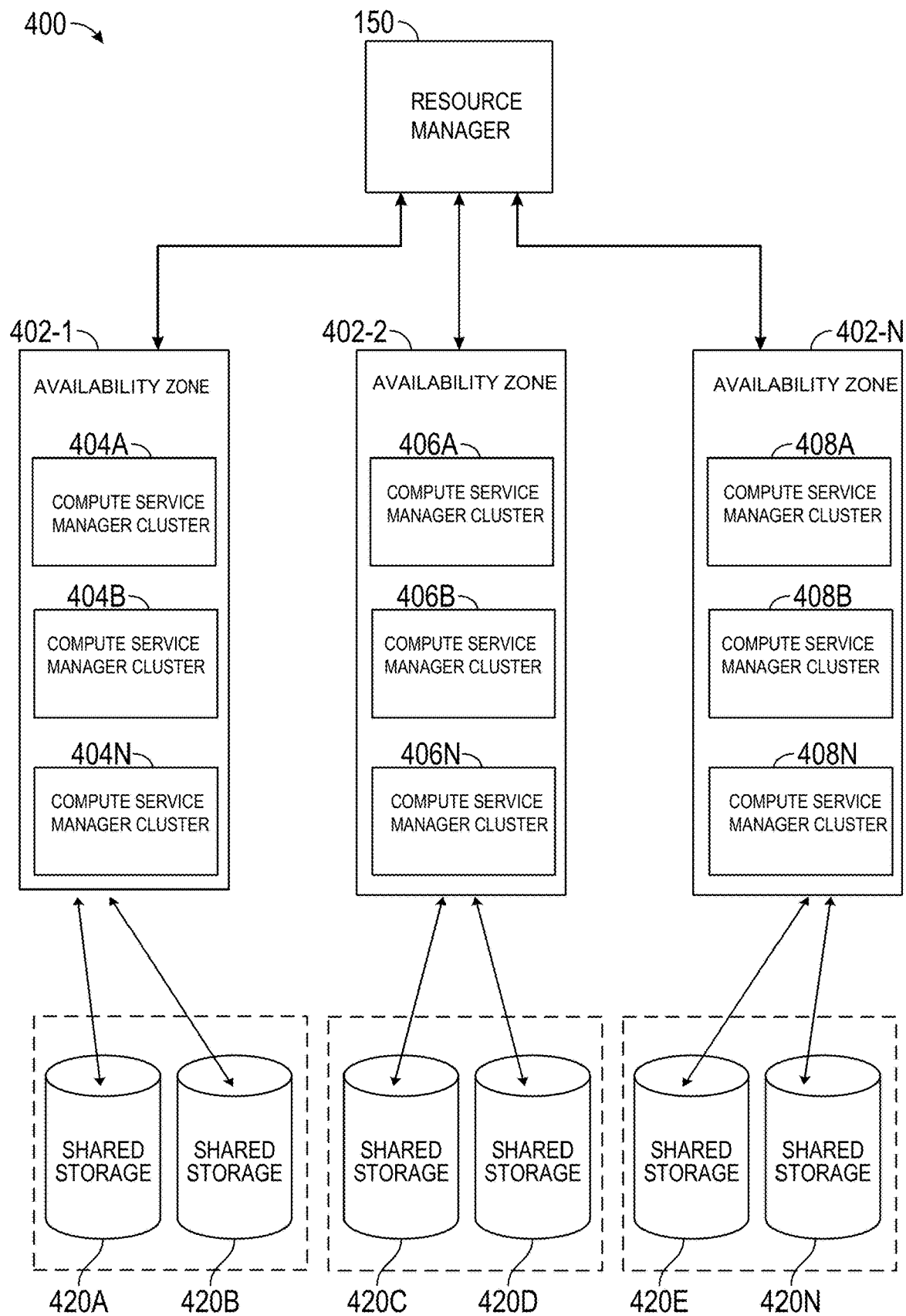
FIG. 4 is a block diagram depicting an example computing environment with the resource manager in communication with instances of compute service manager clusters in different availability zones, in accordance with some embodiments of the present disclosure.

FIG. 4 is a block diagram depicting an example computing environment 400 with the resource manager 150 in communication with instances of compute service manager clusters in different availability zones. In an embodiment, resource manager 150 may be contained in a particular instance of a compute service manager, or could be implemented as a separate component from the compute service manager.

In computing environment 400, the resource manager 150 has access to shared storage devices 420a, 420b, 420c, 420d, 420e and 420n through availability zone 402-1, 402-2, and 402-N. In particular embodiments, shared storage devices 420a-420n are contained in one of the storage platforms described in FIG. 1 and are accessible by any virtual warehouse implemented in one or more execution platforms described before. In some embodiments, the resource manager 150 may access one of compute service manager clusters using a data communication network such as the Internet. In some implementations, a client account may specify that the resource manager 150 (configured for storing internal jobs to be completed) should interact with a particular virtual warehouse 404a-404n at a particular time.

As shown, multiple compute service manager clusters are arranged in each availability zone 402-1, 402-2, and 402-N. For example, compute service manager cluster 404A, compute service manager cluster 404B, compute service manager cluster 404N are included in availability zone 402-1. Compute service manager cluster 406A, compute service manager cluster 406B, and compute service manager cluster 406N are included in availability zone 402-2. Compute service manager cluster 408A, compute service manager cluster 408B, and compute service manager cluster 408N are included in availability zone 402-3.

Each compute service manager cluster can include one or more virtual warehouses (not shown) as described before (e.g., FIG. 3). In an embodiment, each virtual warehouse from a given compute service manager cluster can communicate with a subset of shared storage devices 420a-420n. In such an arrangement, an individual client account associated with a set of data may send all data retrieval and data storage requests through a single virtual warehouse and/or to a certain subset of the shared storage devices 406a-406n.

In an embodiment, the resource manager 150 receives data retrieval, data storage, and data processing requests. In response to such requests, the resource manager 150 routes the requests to an appropriate availability zone with an appropriate compute service manager cluster.

In some embodiments, resource manager 150 provides fault tolerance capabilities by creating a new instance of a compute service manager cluster in response to a failure of a given compute service manager cluster. The new compute service manager cluster may be in the same availability zone or may be created in a different compute service manager cluster at a different zone.

In some examples, cloud service providers corresponding to a given execution platform provide multiple availability zones in a region. These zones can go down due to unforeseen events. Embodiments of the subject technology can actively and passively balance the placement of instances of compute service managers (e.g., compute service manager 108-1, compute service manager 108-2, compute service manager 108-N) among availability zones in a way that offers maximum protection against availability zone outages.

The subject system runs multiple clusters of global services (e.g., compute service managers) in the same cloud provider region to serve separate groups of customers. In this multi-cluster architecture, it is important to ensure that not only is each cluster balanced across availability zones, but also that all the instances in each cluster taken together are zone-balanced ("Global Zone Balancing"), otherwise there will be an outsized impact to customers in the event of a zonal outage.

Embodiments of the subject system can avoid a case where an entire cluster of size greater than 1 goes down due to a zone outage, preventing a transparent redirecting of queries and causing a customer-visible outage. Furthermore, the subject system balances all instances in all clusters together which protects smaller clusters and spreads the impact of a zone outage onto each cluster where they can be handled transparently.

Embodiments described herein have the following advantages:

Best resiliency against zone outage possible with the current architecture.

Each cluster is fully balanced, so the absolute minimum proportion of instances are lost during a zone outage for each cluster. Furthermore, since the deployment as a whole is also balanced via global zone balancing, losing a minimum number of instances and affecting the least number of clusters is possible.

Actively corrects imbalanced clusters. Clusters and the whole deployment can become unbalanced due to instances becoming sick or if new instances are needed but none are available in the zone that is needed. The subject technology can account for these cases and also perform zone rebalancing at both the cluster and global level at the same time.

Parameterizable balance parameters to limit the number of rebalancing moves, allowing greater flexibility and limiting instance churn.

Completely transparent to customers. Under normal circumstances, there is zero visible impact to the customer during the rebalancing process.

Furthermore, zonal outages are also mostly transparent to the customer since we will redirect queries to another instance seamlessly. Finally, free pool instances for rebalancing are provisioned only on-demand and prior to rebalancing moves and this process is done in the background.

Intuitively, a set of compute service manager clusters is balanced when there is substantially an equal number of clusters in each zone. It is possible to quantify how balanced a set of instances is by calculating the difference between the number of instances in the most loaded zone (e.g., based on a total number of cluster instances in that zone when compared to cluster instances in other zones) and the least loaded zone, which is referred to herein as availability zone (AZ) skew.

In some examples, there are several reasons that make minimizing AZ skew more than just striping all of the virtual machine instances across availability zones. The subject system, in some embodiments, implements a multi-cluster architecture where each cluster serves different groups of customers, and each can scale independently of each other to handle load as needed. In order to minimize the impact of an AZ outage on each cluster and on the deployment as a whole, balancing at both the cluster level and the deployment level is implemented.

An objective is to minimize both the AZ skew for each cluster, and for the entire deployment, constrained by an acceptable number of rebalancing changes. Thus, embodiments described herein can prioritize minimizing cluster skew over minimizing global skew, as a total outage for any single cluster could be catastrophic.

Figure 5:
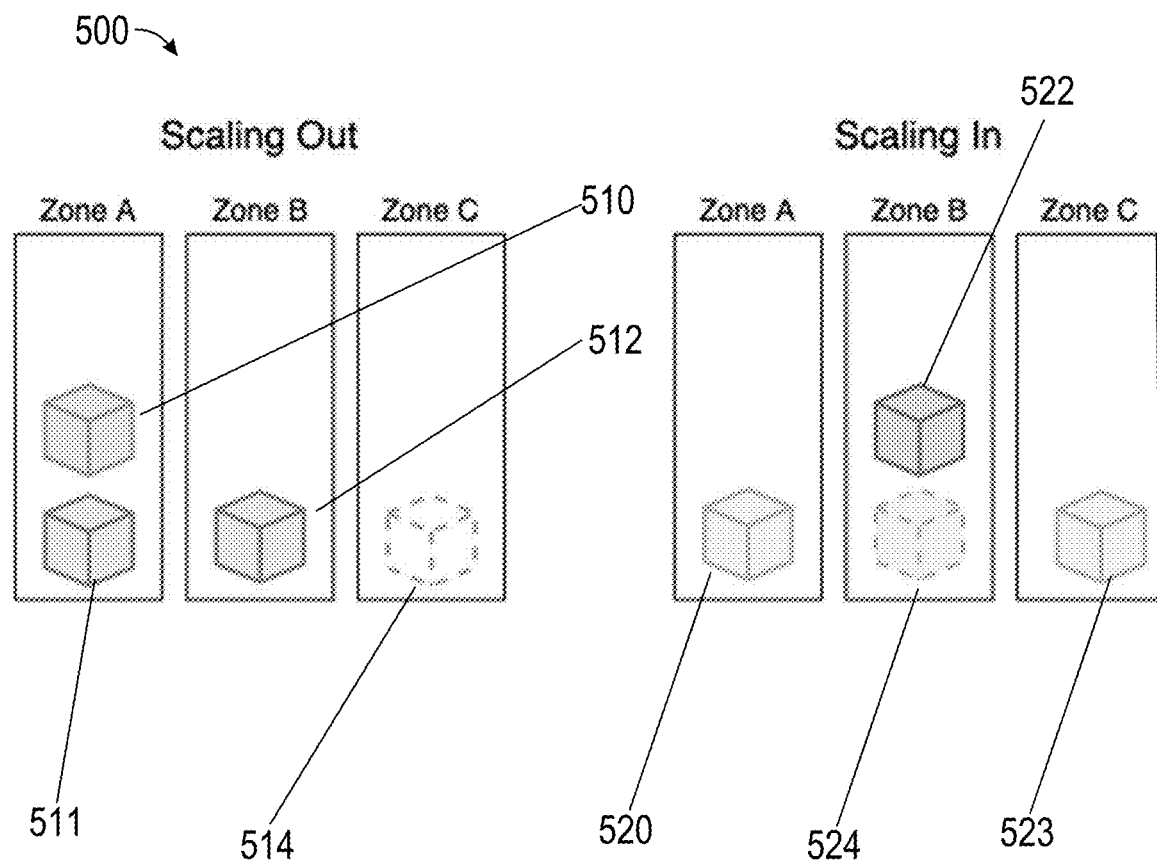
FIG. 5 illustrates examples of scaling clusters in a zone-balanced way, in accordance with some embodiments of the present disclosure.

FIG. 5 illustrates examples 500 of scaling clusters in a zone-balanced way.

As shown, resource manager 150 can scale a cluster out, selecting the least loaded zone globally out of the set of least loaded zones for that cluster. In this example, the least loaded zone corresponds to Zone C without any current clusters that are executing. Zone A has an instance of a cluster 510 of a first type, and Zone A and Zone B each have an instance of a cluster (e.g., cluster 511, cluster 512) of a second type different than the first type. In an example, the resource manager 150 determines that another instance of a cluster of the first type (e.g., corresponding to cluster 510) can be deployed in Zone C (e.g., indicated as a dashed lined cluster 514). To perform the "scaling out" operation, the resource manager 150 deploys a new instance of the first type of cluster (e.g., indicated as cluster 514). A type of cluster may be based on a version of an application, database, or server, and the like that is executing on a particular instance of a given cluster, and different types may have a different version of one or more of the aforementioned.

In a second example, resource manager 150 determines a set of zones with the least number of instances for a particular cluster (e.g., a type of cluster discussed above), and then selects a particular zone with the least number of active instances at a global level. The resource manager 150 can scale a cluster in (e.g., remove a cluster instance), selecting the most loaded zone globally out of the set of most loaded zones for that cluster. In this example, there are three respective instances of a cluster of a first type (e.g., corresponding to a cluster type of cluster 520) in Zone A, Zone B (e.g., cluster 524), and Zone C (e.g., cluster 523). Zone B has two clusters of two different types (cluster 522 of a second type and cluster 524 of the first type). To perform the "scaling in" operation, the resource manager 150 can remove or shutdown a cluster 524 of the first type in Zone B.

Figure 6:
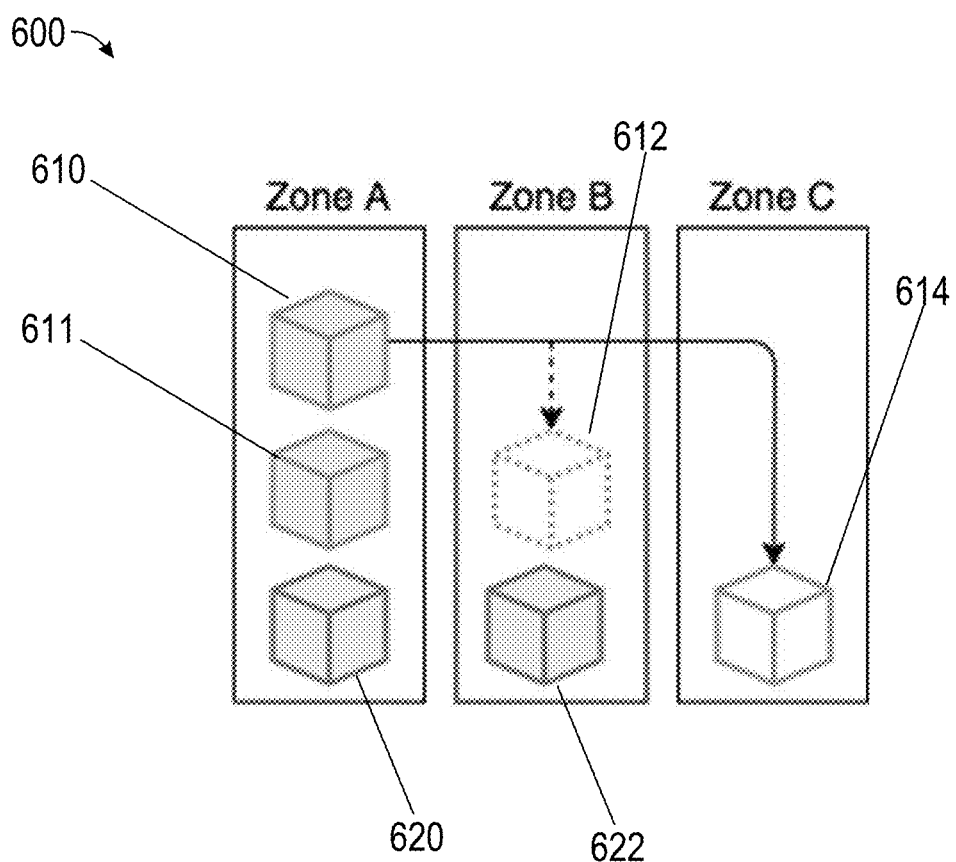
FIG. 6 illustrates examples of selecting rebalancing moves for each cluster, in accordance with some embodiments of the present disclosure.

FIG. 6 illustrates examples 600 of selecting rebalancing moves for each cluster.

There may be situations in which it is not possible to maintain either global zone balancing or cluster-level zone balancing. Thus, there is an additional active zone rebalancing background task, which examines the current state of the deployment and executes a series of moves to balance it. Namely, such a task performed by the resource manager 150 prioritizes moves in the following order:

1. Moves that improve both cluster level and global zone balancing
2. Moves that improve cluster balancing
3. Moves that improve global zone balancing To generate the moves, resource manager 150 can compute the balanced threshold for a cluster, which can be defined based on the number of instances in that cluster divided by the number of available zones. Then, any move from a zone with more instances than that level, to a zone with fewer instances than that level cannot make cluster level balancing worse. After that resource manager 150 can evaluate what criteria each move improves the deployment on and select the best one.

As shown, in an example, Zone A has two instances of a cluster of a first type (e.g., cluster 610 and cluster 611). The resource manager 150 in this example can determine that cluster 610 is to be migrated to Zone B (e.g., cluster 612) or to Zone C (e.g., cluster 614). As mentioned above, resource manager 150 can opt to not move cluster 610 to Zone B and instead decide to move cluster 610 to Zone C (e.g., indicated as cluster 614) based on a determination that cluster balancing would be improved with the move to Zone C instead of Zone B as Zone A would have two cluster instances, Zone B would have a single cluster instance (e.g., cluster 622 of a second type that is same as cluster 620 in Zone A), and Zone C would have a single cluster instance (e.g., corresponding to cluster 610 of a first type now moved to Zone C).

Each move is executed with minimal customer impact, as the old instance is allowed to finish currently running jobs while the new one accepts incoming queries. Additionally, resource manager 150 is aware of how many instances are needed to rebalance a set of instances to within a target skew, and will provision free instances of the correct category and zone.

It can be difficult to maintain full global zone balance (skew ≤1) without making moves too frequently such that the ability of resource manager 150 to conduct other orchestration tasks is impeded. For example, a cluster could scale up into a specific zone to maintain cluster level zone balancing, but if that zone was already heavily loaded globally, resource manager 150 may need to rebalance another cluster to maintain global zone balancing. As mentioned above, rebalancing incurs scheduling overhead as the instance in the old zone needs to finish executing running jobs.

As a result, resource manager 150 maintains a global AZ skew leniency threshold below which the resource manager 150 can only consider cluster-level rebalancing moves. This parameter essentially trades skew leniency for instance churn rate, and resource manager 150 can decide an optimal value that provides acceptable skew while smoothing over temporary global zone imbalances that are incurred as part of normal cluster scaling operations. This optimal value can be determined as a percentage of the total size of the deployment, with minimum and maximum values.

Figure 7:
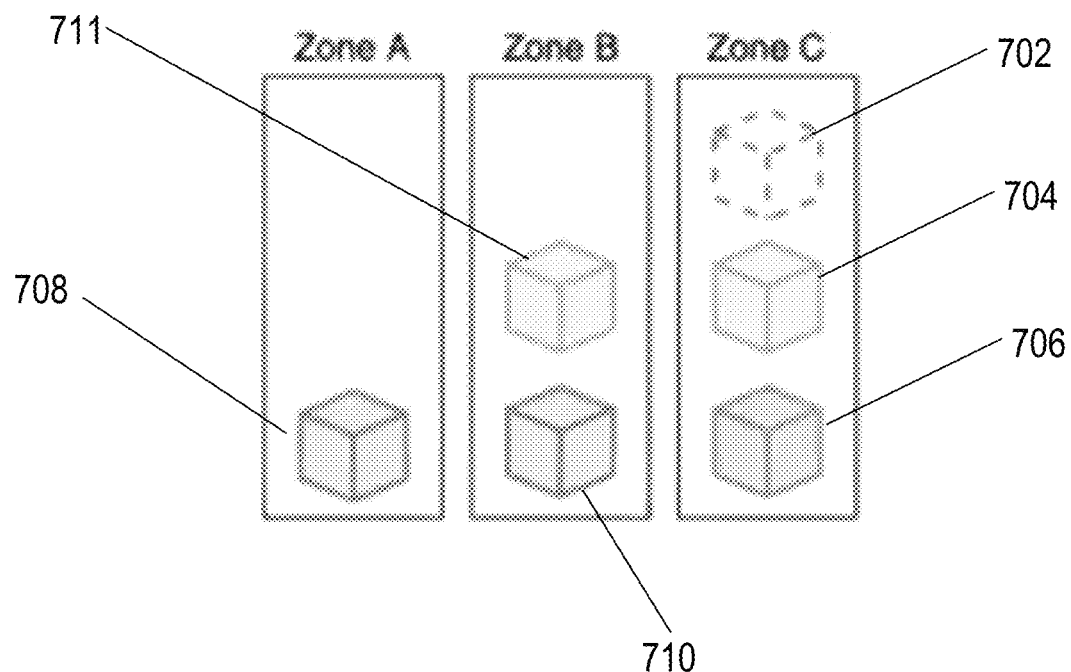
FIG. 7 illustrates examples of a suboptimal scale out, in accordance with some embodiments of the present disclosure.

FIG. 7 illustrates examples 700 of a suboptimal scale out, in accordance with some embodiments of the present disclosure.

As shown, a current configuration includes several clusters in respective zones (e.g., without a dashed line cluster 702 in Zone C that corresponds to a type of cluster corresponding to cluster 708 in Zone A and cluster 710 in Zone B). In this example, there is an instance of the same type of cluster in Zone A and Zone B (e.g., cluster 708 and cluster 710), and adding another cluster instance of the same type in Zone C (e.g., represented as the dashed line cluster 702) could result in a balance of such clusters in Zone A to Zone C. Moreover, there are two instances of the same type of cluster 704 in Zone B (e.g., cluster 711) and Zone C (e.g., cluster 704), and there is a single instance of a different type of cluster 706 in Zone C (e.g., different than the type corresponding to cluster 708 and cluster 710, and different from the other type corresponding to cluster 711 and cluster 704).

However, in this example, if another instance is added to Zone C, this would cause a global imbalance among the zones thereby potentially causing (e.g., triggering) a rebalancing operation(s) by the resource manager 150. If the addition of another instance into Zone C is allowed (e.g., tolerated for a particular time period), it can be likely that another event will trigger additional clusters to be added to Zone A and Zone B resulting in a more balanced set of clusters in the zones. In some examples, this event to commence another rebalancing operation by the resource manager 150 can include determining, periodically (e.g., within a predetermined period of time such as 1 minute, 30 seconds, several minutes, and the like) that the zones are imbalanced, determining that adding another cluster instance of cluster 704 or cluster 706 can result in a better balance of clusters on a global level.

The following discussion relates to additional different implementations of global zone balancing that can be performed by resource manager 150.

Resource manager 150 can distribute clusters evenly across availability zones, such that loss of one zone disrupts the smallest fraction of customers. A fully zone-balanced deployment is both:

Cluster-level zone balanced: all clusters are zone balanced internally (as currently implemented with instance count)

Globally zone balanced: the cluster distribution is zone balanced across the entire deployment using a metric called unique cluster count.

For example, consider the following deployment with AZs 1-3 and instances by cluster A-E:

|     | E   |   |   |     |   |   |   |     |   |   |   |
| --- | --- | - | - | --- | - | - | - | --- | - | - | - |
|     | D   |   |   |     |   |   |   |     |   |   |   |
|     | C   | C |   | vs. | A | D | E | vs. | C | C | E |
|     | B   | B |   |     | A | B | C |     | B | B | D |
|     | A   | A | A |     | A | B | C |     | A | A | A |
| AZ: | 1   | 2 | 3 |     | 1 | 2 | 3 |     | 1 | 2 | 3 |

Left: Cluster-level zone balanced only
Middle: Globally zone balanced only
Right: Both globally and cluster-level zone-balanced The following discussion relates to implementations for performing global zone balancing as discussed above.

First, the subject system runs the cluster-level zone balancing algorithm to ensure that each cluster is balanced internally. This order helps isolate the new changes as the old algorithm doesn't need to be modified to be aware of this change.

A unique cluster count for an availability zone is the number of unique clusters represented in that availability zone regardless of the number of instances per cluster. An unbalanced deployment is one in which the maximal difference in the unique cluster count is greater than 1. The subject system can adjust the threshold to be more lax if this causes too much churn via a parameter.

If the deployment is imbalanced, the phase will find a free pool instance in an under-loaded zone, which is any zone with a unique cluster count more than 1 less than the zone with the max unique cluster count.

If a valid free pool instance is found, the phase will find an instance in the zone with the highest unique cluster count, quiesce it, and replace it with the new instance. Clusters are selected that have their highest instance count for a zone in this zone in an example.

FIG. 8 is a flow diagram illustrating operations of a database system in performing a method, in accordance with some embodiments of the present disclosure. The method 800 may be embodied in computer-readable instructions for execution by one or more hardware components (e.g., one or more processors) such that the operations of the method 800 may be performed by components of network-based database system 102. Accordingly, the method 800 is described below, by way of example with reference thereto. However, it shall be appreciated that method 800 may be deployed on various other hardware configurations and is not intended to be limited to deployment within the network-based database system 102.

At operation 802, the resource manager 150 determines, after a period of time elapses over a periodic segment of time, an imbalance of cluster instances deployed in multiple zones based on a threshold value, the cluster instances including different types of clusters associated with compute service manager instances.

At operation 804, the resource manager 150 identifies a particular type of cluster instance to include in a particular zone from the multiple zones. In an example, the resource manager 150 determines that a total number of the particular type of cluster instance is less than a second total number of a second particular type of cluster instance in the multiple zones.

At operation 806, the resource manager 150 adds the particular type of cluster instance to the particular zone to meet a global balancing of cluster instances in the multiple zones. In an example, adding the particular type of cluster instance includes the resource manager 150 deploying a new instances of the particular type of cluster instance to that particular zone.

At operation 808, the resource manager 150 determines, after a second period of time elapses over the periodic segment of time, that a number of cluster instances deployed in the multiple zones is below the threshold value indicating a current balance of cluster instances in the multiple zones.

Figure 9:
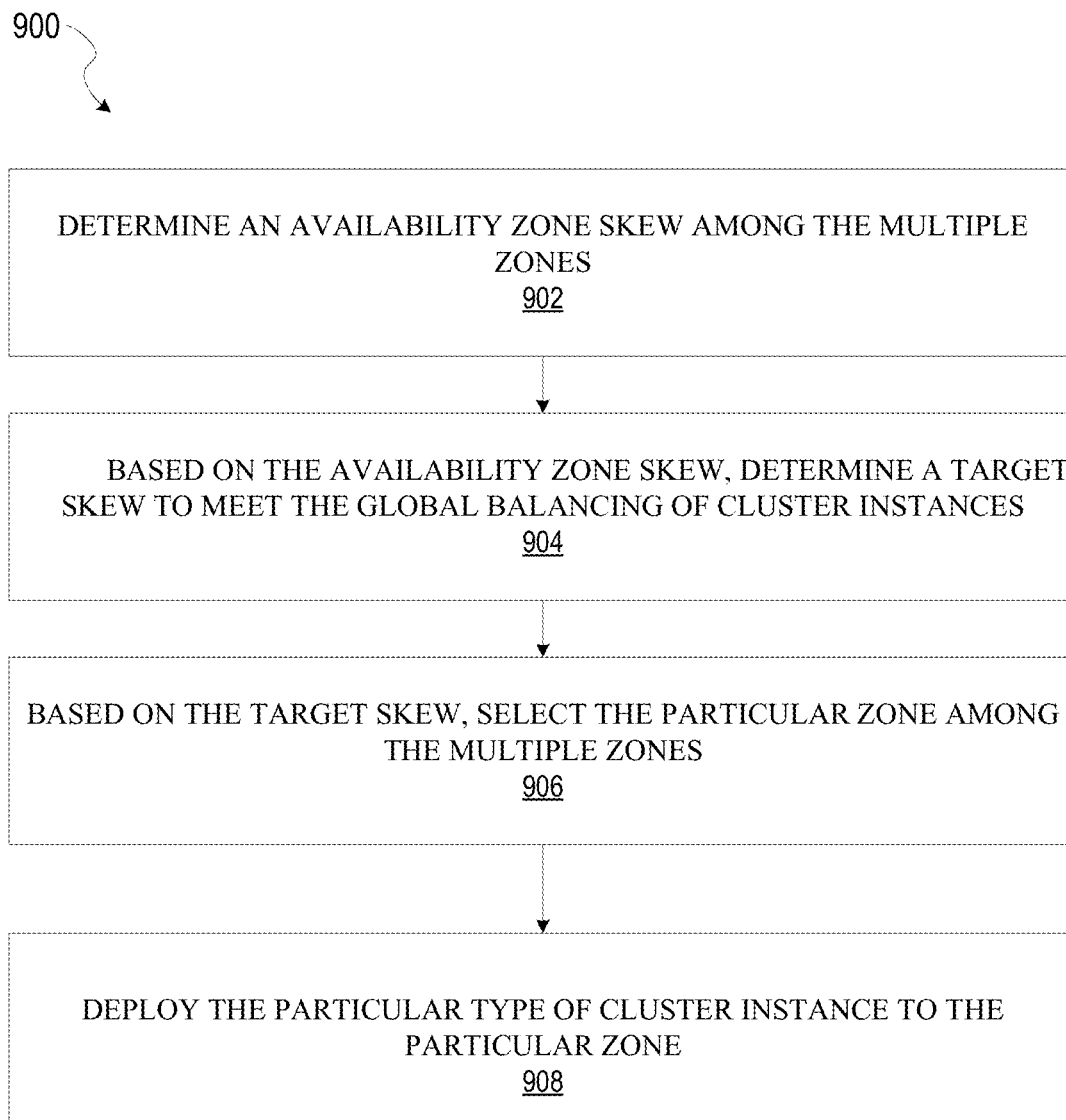
FIG. 9 is a flow diagram illustrating operations of a database system in performing a method, in accordance with some embodiments of the present disclosure.

FIG. 9 is a flow diagram illustrating operations of a database system in performing a method, in accordance with some embodiments of the present disclosure. The method 900 may be embodied in computer-readable instructions for execution by one or more hardware components (e.g., one or more processors) such that the operations of the method 900 may be performed by components of network-based database system 102. Accordingly, the method 900 is described below, by way of example with reference thereto. However, it shall be appreciated that method 900 may be deployed on various other hardware configurations and is not intended to be limited to deployment within the network-based database system 102.

At operation 902, the resource manager 150 determines an availability zone skew among the multiple zones. In an examples, the availability zone skew is based on a difference between a number of instances in a most loaded zone and a second number of instances in a least loaded zone among the multiple zones.

In an embodiment, the resource manger 150, for each zone from the multiple zones, determines a respective number of cluster instances, identifies a first zone that includes a highest number of cluster instances based on the respective number of cluster instances from each zone, and identifies a second zone that includes a lowest number of cluster instances based on the respective number of cluster instances from each zone.

At operation 904, the resource manager 150, based on the availability zone skew, determines a target skew to meet the global balancing of cluster instances. In an example, the target skew is based on a number of factors including a particular number of cluster instances to include in each zone to meet a threshold or percentage of the availability zone skew.

At operation 906, the resource manager 150, based on the target skew, selects the particular zone among the multiple zones. For examples, when a difference between a first number of instances from a most loaded zone and a second number of cluster instances from the particular zone is below a third number associated with the target skew, the particular zone is selected by the resource manager 150.

At operation 908, the resource manager 150 deploys the particular type of cluster instance to the particular zone.

FIG. 10 is a flow diagram illustrating operations of a database system in performing a method, in accordance with some embodiments of the present disclosure. The method 1000 may be embodied in computer-readable instructions for execution by one or more hardware components (e.g., one or more processors) such that the operations of the method 1000 may be performed by components of network-based database system 102. Accordingly, the method 1000 is described below, by way of example with reference thereto. However, it shall be appreciated that method 1000 may be deployed on various other hardware configurations and is not intended to be limited to deployment within the network-based database system 102.

At operation 1002, the resource manager 150 determines a second particular zone from one of the multiple zones that includes a particular number of cluster instances that is greater than each number of instances from each of the multiple zones.

At operation 1004, the resource manager 150 identifies a second particular type of cluster instance to remove based on the second particular zone. In an embodiment, the resource manager 150 determines that a total number of the second particular type of cluster instance in the multiple zones is greater than a second total number of the particular type of cluster instance in the multiple zones.

At operation 1006, the resource manager 150 removes the second particular type of cluster instance from the second particular zone to meet the global balancing of cluster instances in the multiple zones.

Figure 11:
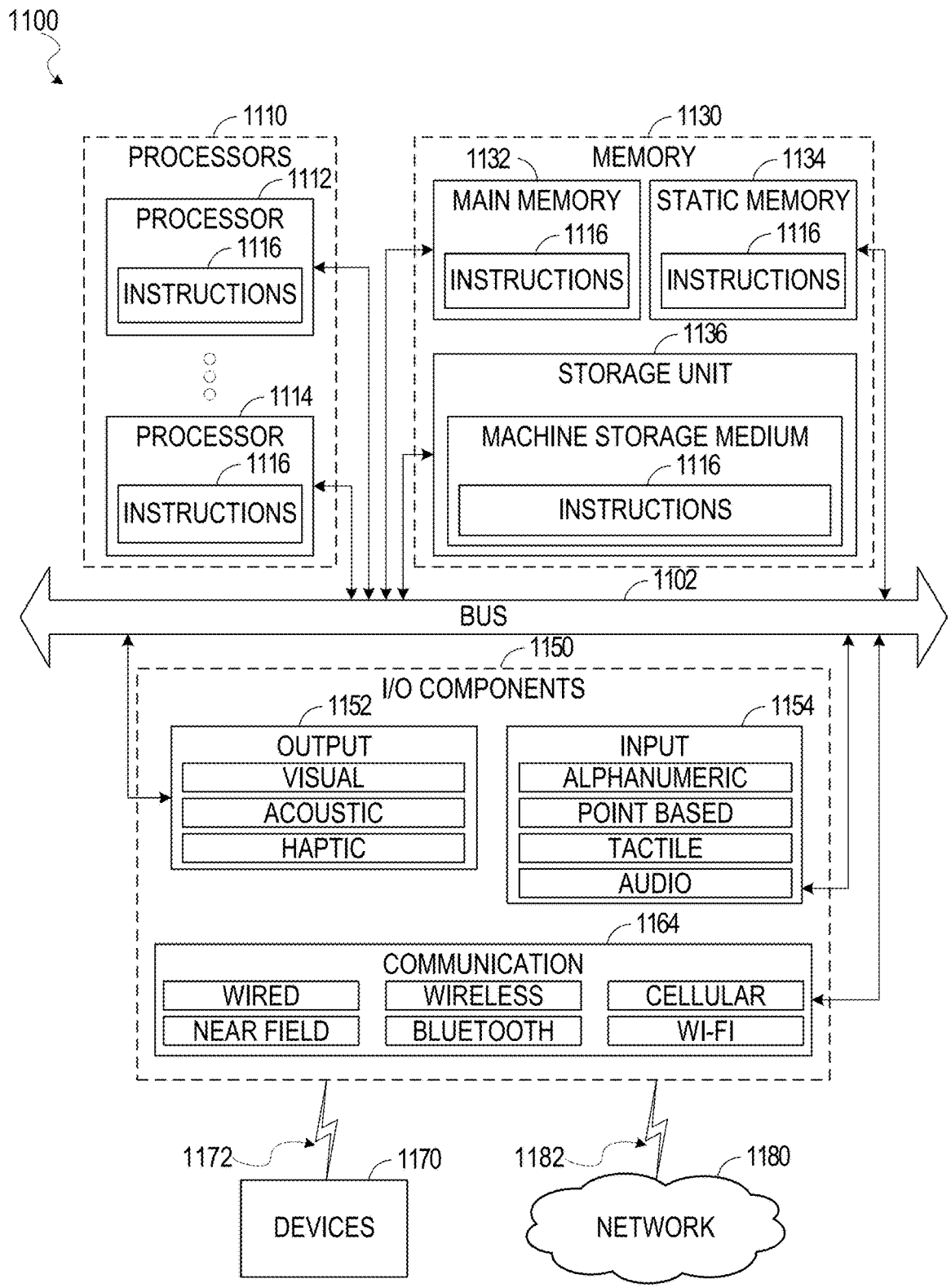
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of any one or more of the methods described above. As another example, the instructions 1116 may cause the machine 1100 to implement portions of the functionality illustrated in any one or more of the previously mentioned figures discussed above. In this way, the instructions 1116 transform a general, non-programmed machine into a particular machine 1100 (e.g., the compute service manager 108-1, the execution platform 110, and the user device 112) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the compute service manager 108-1, the execution platform 110, and the devices 1170 may include the user device 112 or any other computing device described herein as being in communication with the network-based database system 102 or the storage platform 104.

Executable Instructions and Machine Storage Medium

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium"

mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a WiFi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 800 and 1100 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The invention claimed is:

1. A network-based database system comprising:
    at least one hardware processor; and
    a memory storing instructions that cause the at least one hardware processor to perform operations comprising:
    determining an availability zone skew among multiple zones; based on the availability zone skew, determining a target skew to meet a global balancing of cluster instances;
    based on the target skew, selecting a particular zone among multiple zones;
    determining that a total number of a particular type of cluster instance is less than a second total number of a second particular type of cluster instance in the multiple zones;
    deploying the particular type of cluster instance to the particular zone;
    for each zone from the multiple zones, determining a respective number of cluster instances;
    identifying a first zone that includes a highest number of cluster instances based on the respective number of cluster instances from each zone;
    identifying a second zone that includes a lowest number of cluster instances based on the respective number of cluster instances from each zone;
    removing a second particular type of cluster instance from a second particular zone to meet the global balancing of cluster instances in the multiple zones, the second particular zone including a particular number of cluster instances that is greater than each number of instances from each of the multiple zones; and
    determining that a total number of the second particular type of cluster instance in the multiple zones is greater than a second total number of the particular type of cluster instance in the multiple zones.

2. The system of claim 1, wherein the operations further comprise:
    prior to determining the availability zone skew among the multiple zones: determining, after a period of time elapses over a periodic segment of time, an imbalance of cluster instances deployed in multiple zones based on a threshold value, the cluster instances including different types of clusters associated with compute service manager instances.

3. The system of claim 2, wherein the operations further comprise: identifying a particular type of cluster instance to include in the particular zone from the multiple zones.

4. The system of claim 3, wherein the operations further comprise:
    adding the particular type of cluster instance to the particular zone to meet a global balancing of cluster instances in the multiple zones; and
    determining, after a second period of time elapses over the periodic segment of time, that a number of cluster instances deployed in the multiple zones is below the threshold value indicating a current balance of cluster instances in the multiple zones.

5. The system of claim 1, wherein a difference between a first number of instances from a most loaded zone and a second number of cluster instances from the particular zone is below a third number associated with the target skew.

6. The system of claim 1, wherein the availability zone skew is based on a difference between a number of instances in a most loaded zone and a second number of instances in a least loaded zone among the multiple zones.

7. A method comprising:
    determining an availability zone skew among multiple zones; based on the availability zone skew, determining a target skew to meet a global balancing of cluster instances;
    based on the target skew, selecting a particular zone among multiple zones;
    determining that a total number of a particular type of cluster instance is less than a second total number of a second particular type of cluster instance in the multiple zones;
    deploying the particular type of cluster instance to the particular zone;
    for each zone from the multiple zones, determining a respective number of cluster instances;
    identifying a first zone that includes a highest number of cluster instances based on the respective number of cluster instances from each zone;
    identifying a second zone that includes a lowest number of cluster instances based on the respective number of cluster instances from each zone;
    removing a second particular type of cluster instance from a second particular zone to meet the global balancing of cluster instances in the multiple zones, the second particular zone including a particular number of cluster instances that is greater than each number of instances from each of the multiple zones; and
    determining that a total number of the second particular type of cluster instance in the multiple zones is greater than a second total number of the particular type of cluster instance in the multiple zones.

8. The method of claim 7, further comprising:
    prior to determining the availability zone skew among the multiple zones: determining, after a period of time elapses over a periodic segment of time, an imbalance of cluster instances deployed in multiple zones based on a threshold value, the cluster instances including different types of clusters associated with compute service manager instances.

9. The method of claim 8, further comprising:
    identifying a particular type of cluster instance to include in the particular zone from the multiple zones.

10. The method of claim 9, further comprising:
    adding the particular type of cluster instance to the particular zone to meet a global balancing of cluster instances in the multiple zones; and
    determining, after a second period of time elapses over the periodic segment of time, that a number of cluster instances deployed in the multiple zones is below the threshold value indicating a current balance of cluster instances in the multiple zones.

11. The method of claim 7, wherein a difference between a first number of instances from a most loaded zone and a second number of cluster instances from the particular zone is below a third number associated with the target skew.

12. The method of claim 7, wherein the availability zone skew is based on a difference between a number of instances in a most loaded zone and a second number of instances in a least loaded zone among the multiple zones.

13. A non-transitory computer-storage medium comprising instructions that, when executed by one or more processors of a machine, configure the machine to perform operations comprising:
   determining an availability zone skew among multiple zones;
   based on the availability zone skew, determining a target skew to meet a global balancing of cluster instances;
   based on the target skew, selecting a particular zone among multiple zones;
   determining that a total number of a particular type of cluster instance is less than a second total number of a second particular type of cluster instance in the multiple zones;
   deploying the particular type of cluster instance to the particular zone; for each zone from the multiple zones, determining a respective number of cluster instances;
   identifying a first zone that includes a highest number of cluster instances based on the respective number of cluster instances from each zone;
   identifying a second zone that includes a lowest number of cluster instances based on the respective number of cluster instances from each zone;
   removing a second particular type of cluster instance from a second particular zone to meet the global balancing of cluster instances in the multiple zones, the second particular zone including a particular number of cluster instances that is greater than each number of instances from each of the multiple zones; and
   determining that a total number of the second particular type of cluster instance in the multiple zones is greater than a second total number of the particular type of cluster instance in the multiple zones.

14. The non-transitory computer-storage medium of claim 13, wherein the operations further comprise:
   prior to determining the availability zone skew among the multiple zones: determining, after a period of time elapses over a periodic segment of time, an imbalance of cluster instances deployed in multiple zones based on a threshold value, the cluster instances including different types of clusters associated with compute service manager instances.

15. The non-transitory computer-storage medium of claim 14, wherein the operations further comprise:
   identifying a particular type of cluster instance to include in the particular zone from the multiple zones.

16. The non-transitory computer-storage medium of claim 15, wherein the operations further comprise:
   adding the particular type of cluster instance to the particular zone to meet a global balancing of cluster instances in the multiple zones; and
   determining, after a second period of time elapses over the periodic segment of time, that a number of cluster instances deployed in the multiple zones is below the threshold value indicating a current balance of cluster instances in the multiple zones.

17. The non-transitory computer-storage medium of claim 13, wherein a difference between a first number of instances from a most loaded zone and a second number of cluster instances from the particular zone is below a third number associated with the target skew.

18. The non-transitory computer-storage medium of claim 13, wherein the availability zone skew is based on a difference between a number of instances in a most loaded zone and a second number of instances in a least loaded zone among the multiple zones.

\* \* \* \* \*

UNITED STATES PATENT AND TRADEMARK OFFICE
CERTIFICATE OF CORRECTION

PATENT NO. : 11,537,566 B1
APPLICATION NO. : 17/806852
DATED : December 27, 2022
INVENTOR(S) : Harjono et al.

It is certified that error appears in the above-identified patent and that said Letters Patent is hereby corrected as shown below:

In the Claims

In Column 23, Line 30, in Claim 1, delete "zones:" and insert --zones;-- therefor Signed and Sealed this
Thirty-first Day of October, 2023

Katherine Kelly Vidal
*Director of the United States Patent and Trademark Office*